Aug. 26, 1924.
J. McKECHNIE
1,506,375
CONTROL AND REVERSING GEAR OF INTERNAL COMBUSTION ENGINES
Filed May 15, 1922      7 Sheets-Sheet 1
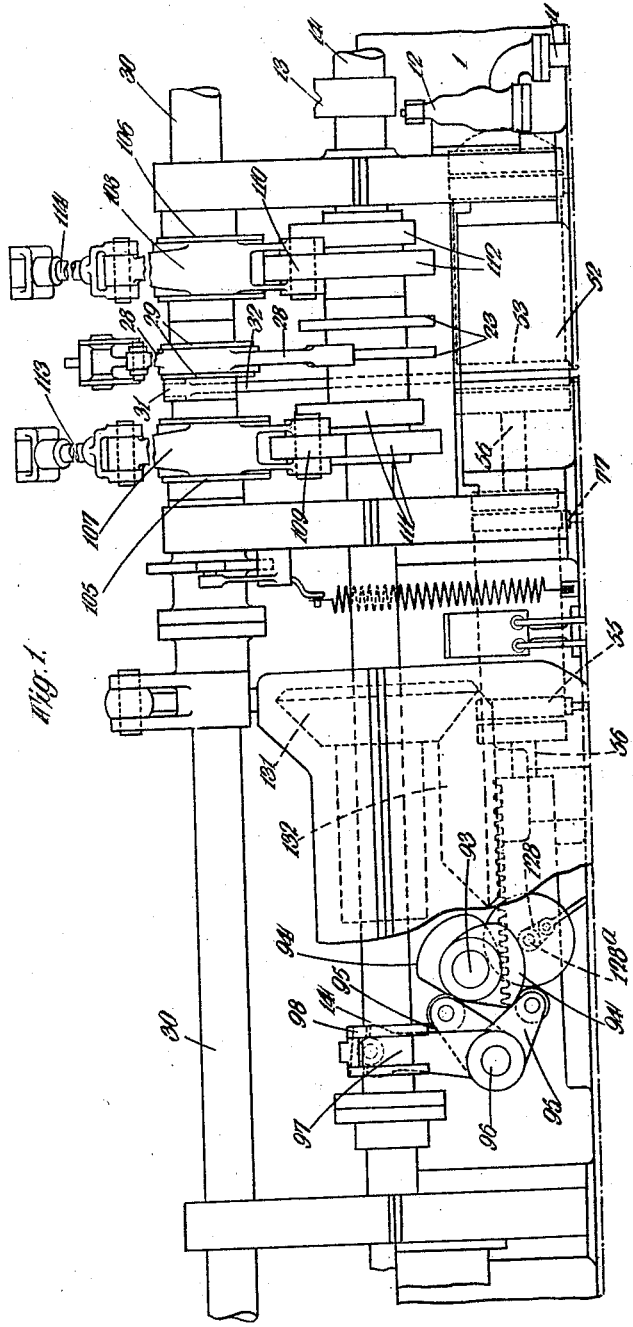

Aug. 26, 1924.
1,506,375
J. McKECHNIE
CONTROL AND REVERSING GEAR OF INTERNAL COMBUSTION ENGINES
Filed May 15, 1922    7 Sheets-Sheet 2

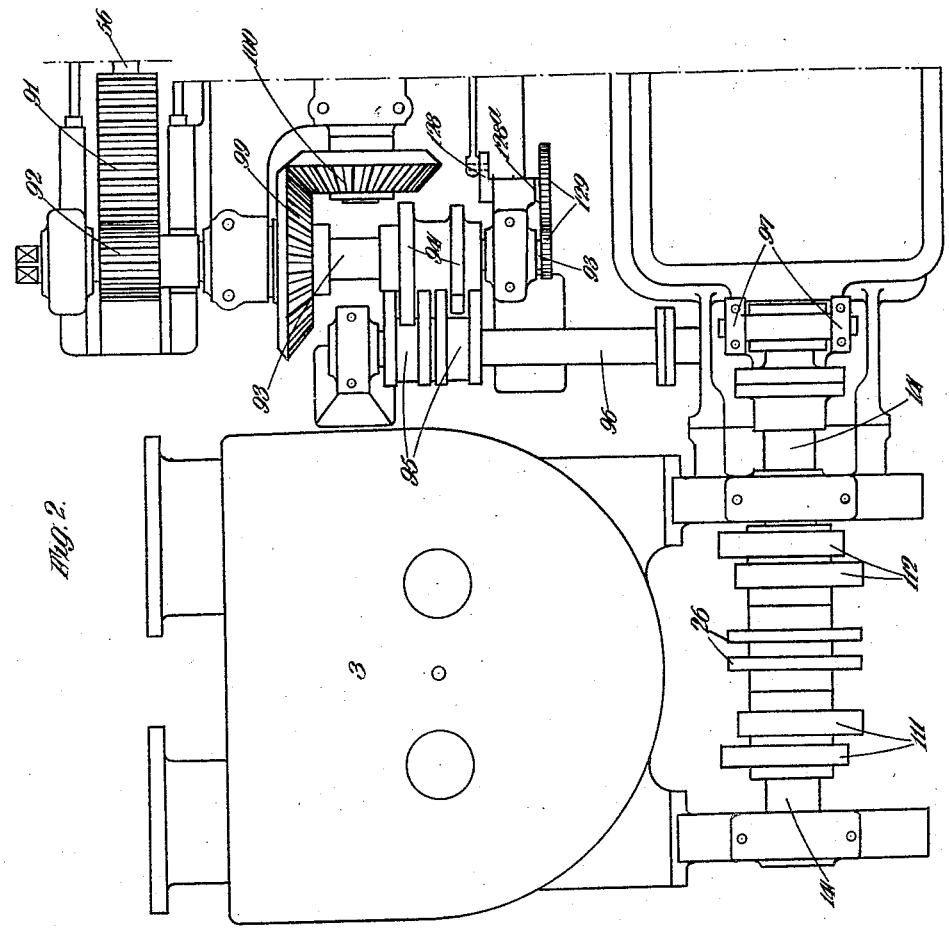

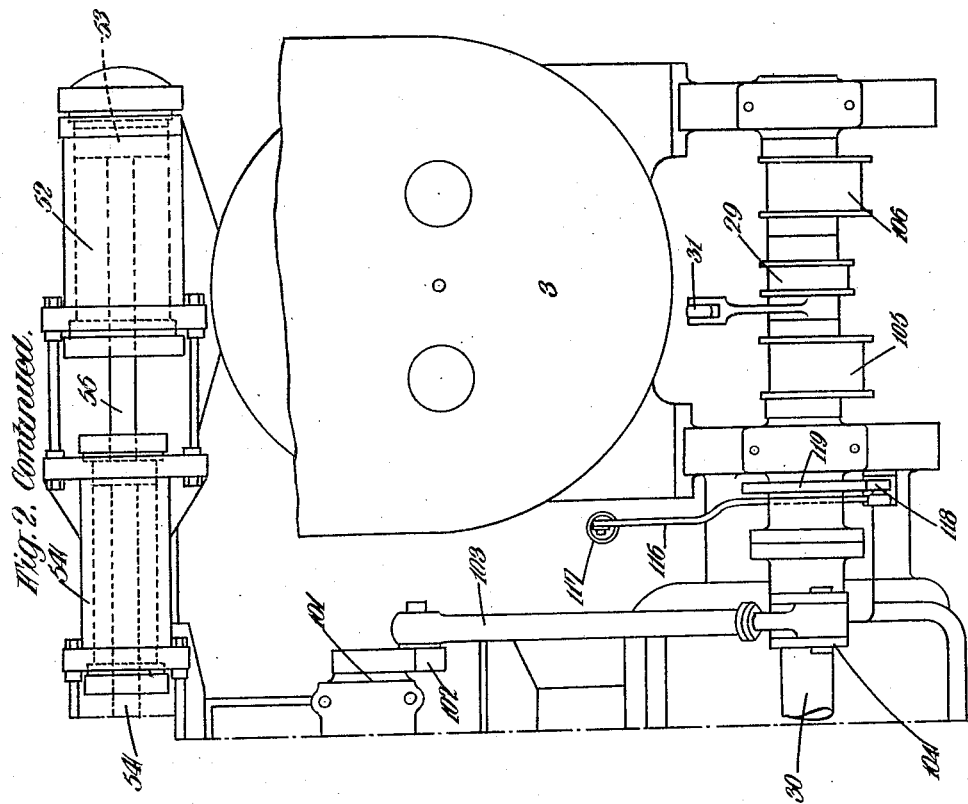

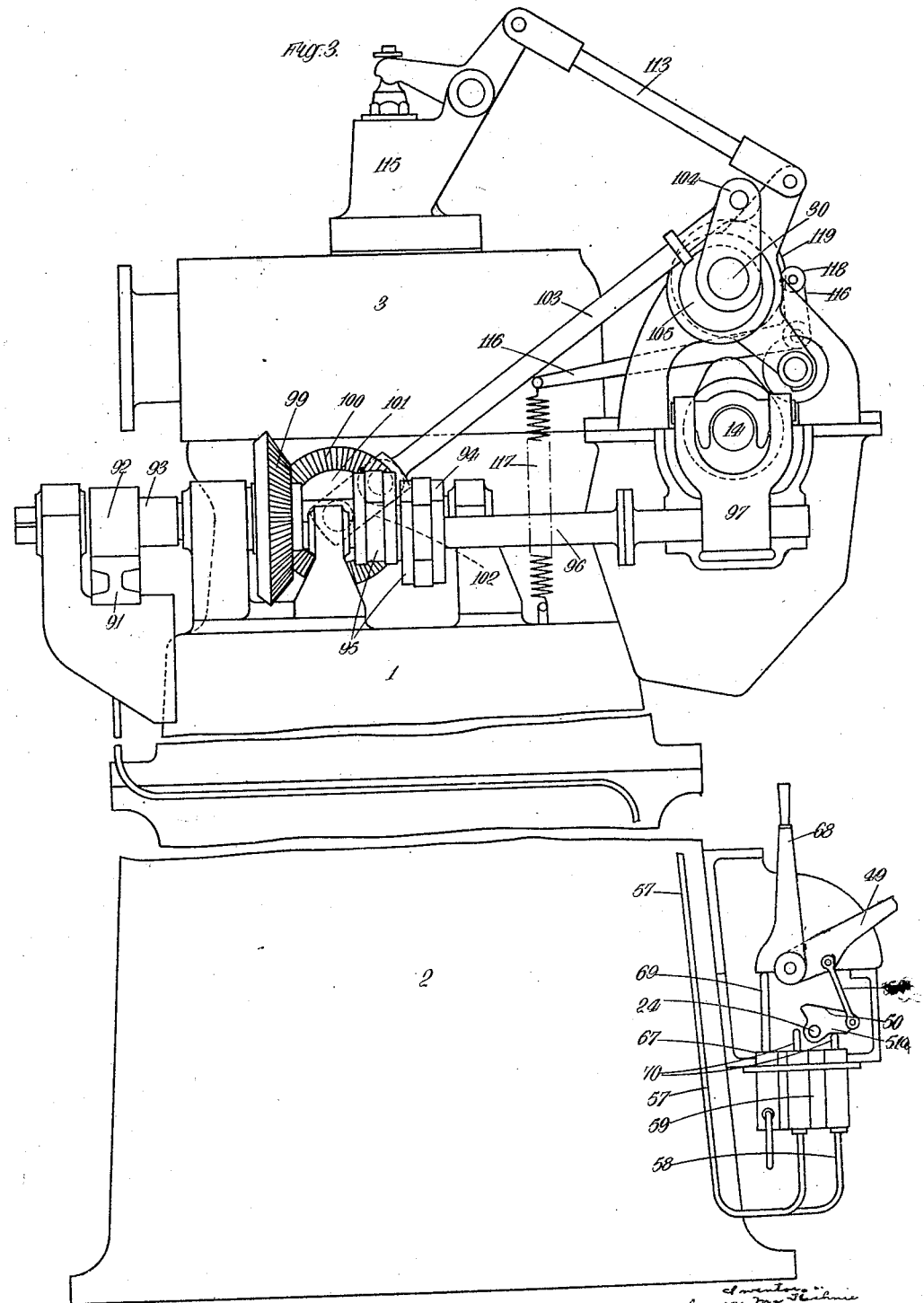

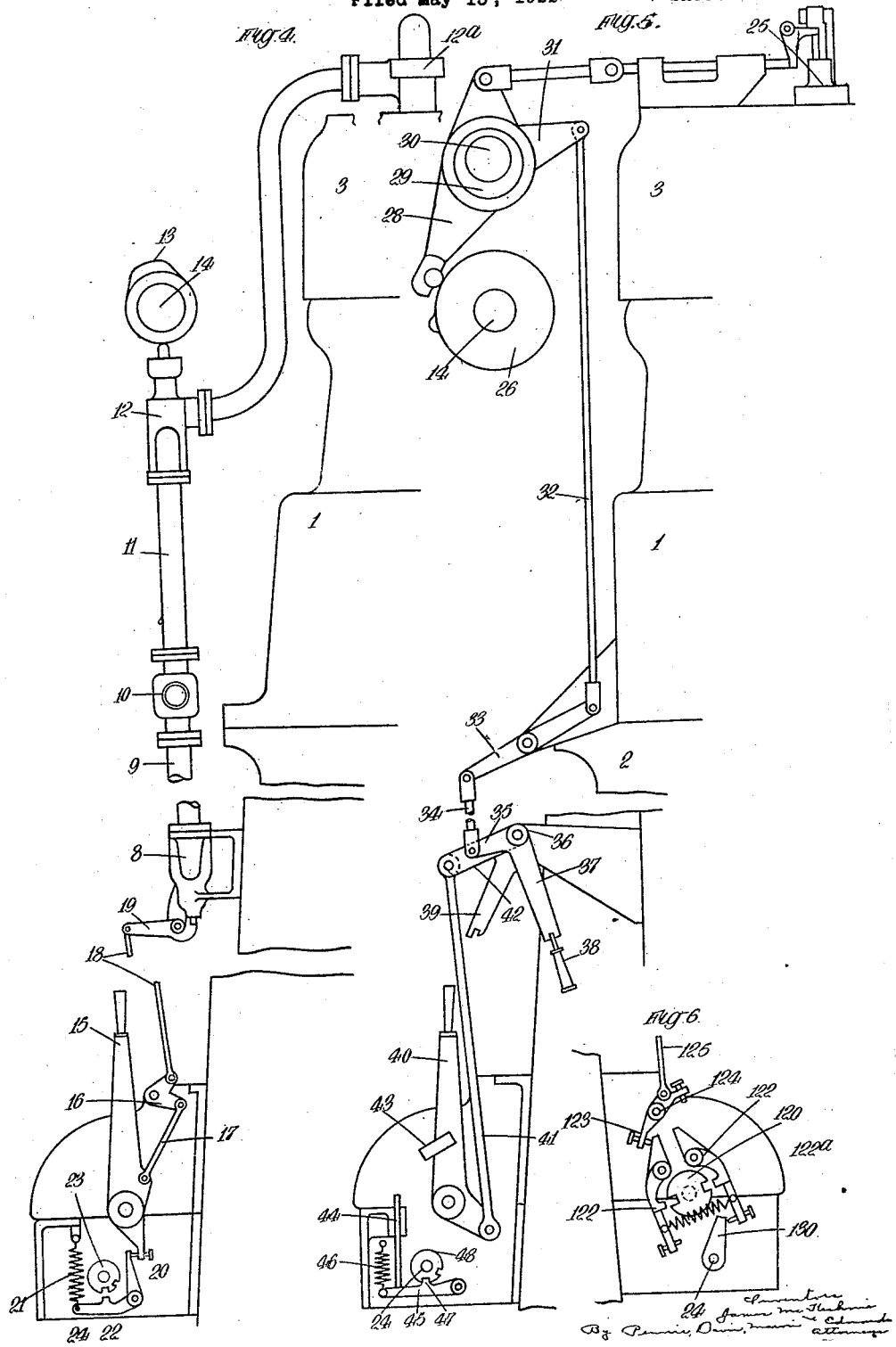

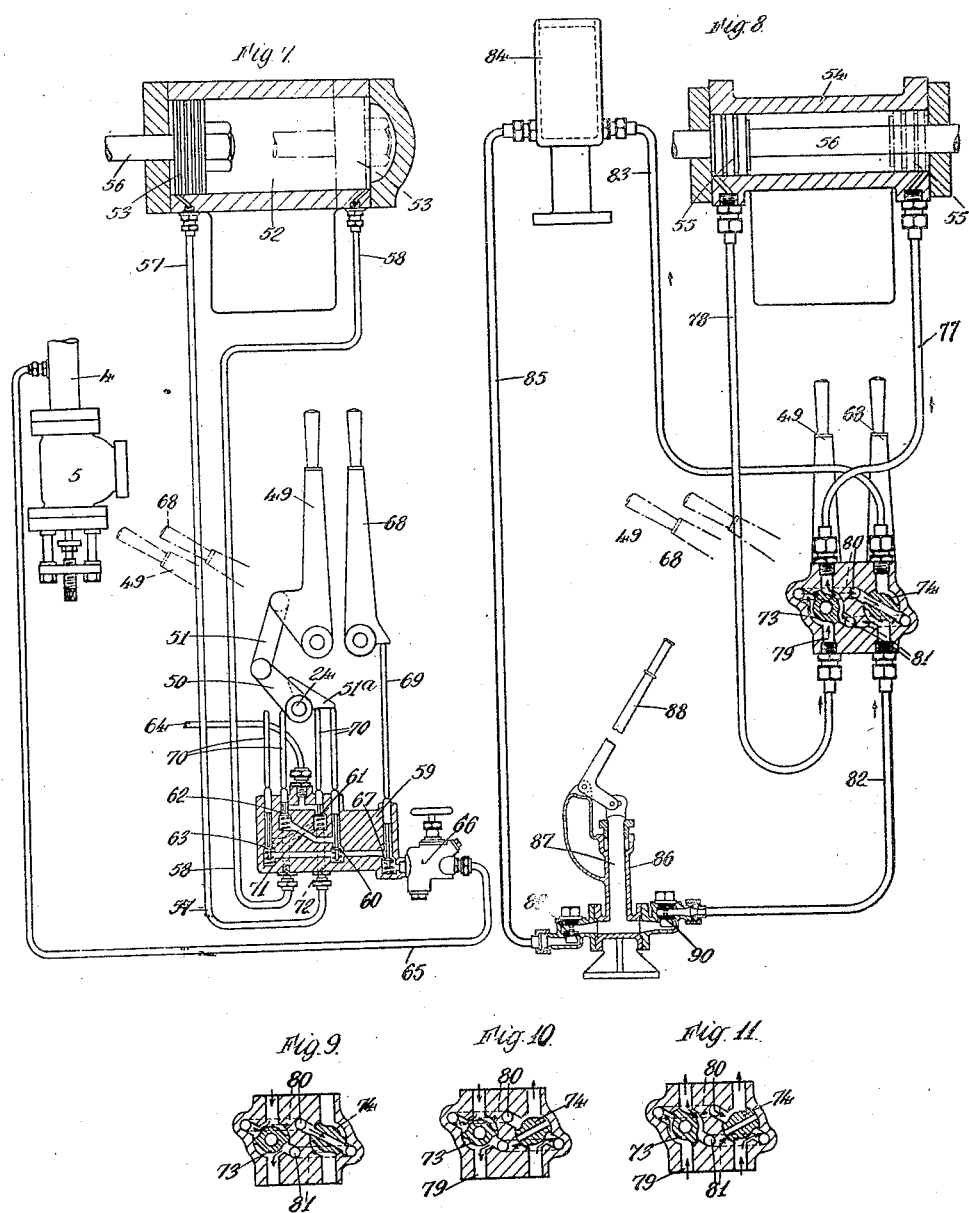

Patented Aug. 26, 1924.

1,506,375

UNITED STATES PATENT OFFICE.

JAMES McKECHNIE, OF WESTMINSTER, LONDON, ENGLAND, ASSIGNOR TO VICKERS LIMITED, OF WESTMINSTER, ENGLAND.

CONTROL AND REVERSING GEAR OF INTERNAL-COMBUSTION ENGINES.

Application filed May 15, 1922. Serial No. 561,191.

*To all whom it may concern:*

Be it known that I, Sir JAMES McKECHNIE, K. B. E., a subject of the King of Great Britain, residing at Vickers House, Broadway, Westminster, in the county of London, England, have invented certain new and useful Improvements in or Relating to the Control and Reversing Gears of Internal-Combustion Engines, of which the following is a specification.

This invention relates to the control and reversing gear of internal combustion engines of high power and has for its chief object to increase the speed of the control of the engine so as to enable it to be started, stopped and reversed in substantially reduced time as compared with the time previously required for engines of corresponding size.

According to this invention the starting, stopping and reversing operations are all under the control of levers which are so interlocked as to prevent the use of any one of them when the conditions are such that its operation would be dangerous. It has been the practice in large engines to effect the reversal and also some of the other control operations by means of a hand wheel, but this involves a much longer time for the operation than is required for the movement of a lever and the present arrangement of a lever control with interlocking gear allows the operator to put pressure on any lever in advance of its operation, so that immediately the interlocking gear permits an operation it is effected, greatly increasing the rapidity of control of the engine.

The reversing apparatus is under the control of a hand lever which can be moved into either one of two positions, for the ahead and the astern directions of the engine, and to enable the reversing to be effected under power, we propose to employ a servo motor with oil cylinder and plunger and a separate compressed air cylinder having a piston operated in either direction by air introduced into either end of the cylinder through pipes leading from a servo motor air distributor box provided with two pairs of valves under the control of the reversing lever. The air supply to the distributor is through a pilot valve which is normally open, but is controlled by a change over lever, preferably adjacent to the reversing lever, which when turned into a position to close the pilot valve allows the reversing to be effected by hand in the event of the compressed air (usually from the starting air supply) not being available. The inlet and outlet valves and the pilot valve are preferably spring closed and opened against the pressure of their springs by the respective levers.

For power reversing the oil cylinder of the servo motor acts only as an oil buffer, forcing the oil from one end of the cylinder to the other as the plunger moves, but when hand reversing has to be employed an emergency hand pump is brought into action by the aid of a change over cock in the oil supply system, under the control of the change over lever, which cock brings the hand pump and an oil container into the oil supply circuit. A second cock, operated by the reversing lever and employed whether power or hand reversing is in use, determines the direction of movement of the oil.

The engine is preferably one in which liquid fuel is injected, without the aid of injecting air, through a spraying valve in the cylinder and the valve control may be of the kind described in the specification Serial No. 348,702 and the air starting arrangement of the type described in the specification Serial No. 472,727. The fuel valve control and starting air control levers (the latter operating the rapid action valve of specification No. 472,727) are interlocked with the reversing lever by any suitable locking device. A convenient construction which may be employed is to provide a locking shaft, actuated by the reversing lever, with a pair of collars each having a pair of notches corresponding to the ahead and the astern positions of the reversing lever, a small spring controlled locking lever for each collar having a nose adapted to enter into either one of the said notches. The locking levers are controlled respectively by the starting air and the fuel valve control lever so that, according to the position of these levers, the reversing lever is held fast or is free to operate.

Corresponding locking devices operated either by the hand reversing lever or by the servo motor prevent the operation of the spraying valve and air control levers until the reversing movement is effected.

In order that the said invention may be clearly understood and readily carried into effect, the same will now be described more fully with reference to the accompanying drawings, in which:—

Figure 2 is a plan of the same portion of the engine.

Figure 3 is a side elevation of the engine showing more especially the reversing gear.

Figures 4 and 5 are side elevations showing separately the arrangement of starting air control and of fuel valve control.

Figure 6 is a detail view of a locking device for the air starting and fuel valve control levers.

Figures 7 and 8 are general diagrammatic views of the controlling apparatus for reversing purposes; and Figures 9, 10 and 11 are detail views showing in a diagrammatic manner the various positions of reversing and change over cocks controlling the oil flow in part of the reversing apparatus.

Figure 1:
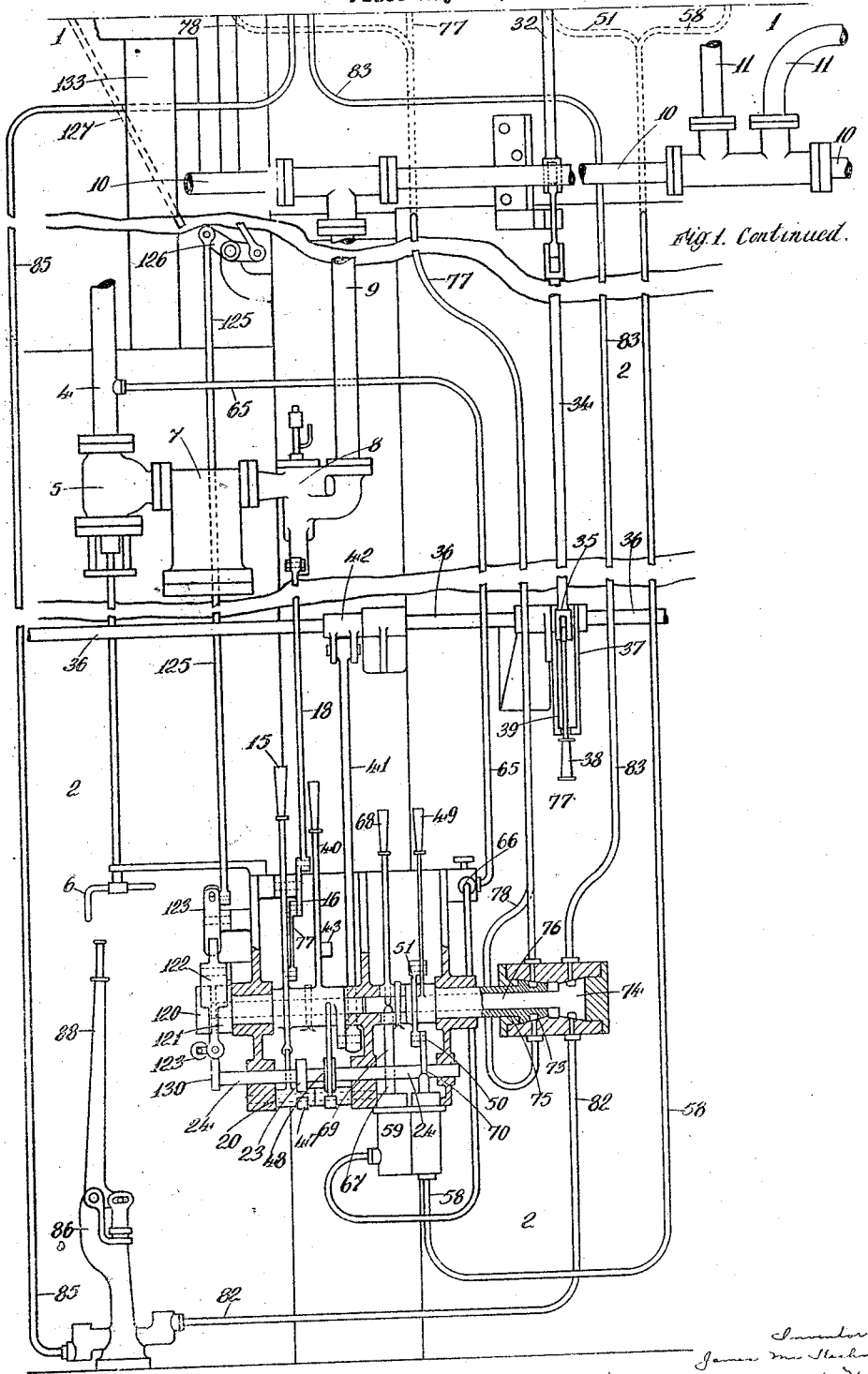
Figure 1 is a front elevation of part of a multi-cylinder internal combustion engine showing the general arrangement of gears in accordance with this invention, the figure being divided into parts owing to its size.

The starting, stopping and reversing gear embodied in this invention is situated mainly at the top of the engine, being carried by the entablature 1 mounted on the vertical framing 2 and extending across the engine so as to connect the various cylinders at their upper ends, the cylinder covers 3 being placed above the entablature. The controlling part of the mechanism is situated between a pair of cylinders at the front of the engine and close to the floor level.

Dealing first with the air starting mechanism, the air supply main 4 is connected to the master valve 5 under the control of the hand-wheel 6, this master valve being of the usual slow acting stop-valve type and connected through the strainer 7 to the rapid action valve 8 from which the vertical pipe 9 leads to the horizontal distributing pipe 10, having branches 11 passing to each cylinder. Each branch pipe 11 leads to the air timing valve 12 controlled by the cam 13 on the longitudinally displaceable cam shaft 14 which also carries the double cams (forward and reverse) for the inlet, exhaust and fuel spray valve levers. From the timing valve 12 the air passes to the cylinder through the non-return admission valve 12ᵃ in the cylinder cover 3, so that no back pressure from the cylinder can pass into the air supply system. The arrangement of master valve and rapid action valve is on the lines described in the specification No. 472,727 already referred to.

The admission of starting air through the rapid action valve 8 is under the control of the starting air control lever 15, which, as shown more particularly in Figure 4, acts through the bell crank lever 16 to which it is connected by the link 17, this bell crank lever 16 forming a leverage intensifier owing to the toggle action between its second arm and the connecting rod or link 18 leading to the lever 19 belonging to the rapid action valve 8. On pulling forward the lever 15, when this is free to move, the rapid action valve 8 is opened. In the position shown in Figure 4 the valve 8 is closed, as the lever 15 is in its off-position. In this position it acts upon the end of the locking lever 20, the other end of which is under the control of the spring 21 this locking lever carrying a small nose 22, which is adapted to engage in either one of the two notches shown in Figure 4 in the disc 23, which is secured on the locking shaft 24 for the reversing lever, as hereinafter described. When the lever 20 is released by pulling forward the starting air control lever 15, the nose 22 engages in one or other of the notches of the disc 23 and prevents the rotation of the locking shaft 24.

The fuel or spray valve 25, carried by the cylinder cover 3, is operated during the running of the engine by the timing cam 26 on the cam shaft 14, which carries the cams for the inlet, exhaust, fuel and starting valves. The cam 26 acts on the fuel valve lever 28 mounted on the eccentric fulcrum 29 on the fulcrum shaft 30, which shaft carries the levers for the inlet, exhaust and fuel valves. The eccentric 29 is moved by the eccentric arm 31 connected through the rod 32 to one end of the lever 33, pivoted centrally to a bracket on the engine framing, the other end of this lever being connected through the rod 34 to the bell crank cut-out lever 35 freely mounted on the common control shaft 36, which extends across the complete set of cylinders, the lever 35 being under individual hand-control by the handle 38 so as to throw out any one of the spray valves if desired in case of emergency. On the shaft 36 is fixed the common control lever 37 notched at its outer end and connectible to the handle 38 by a catch on the handle. The arm 39, the lower end of which is also notched and is adapted when the handle 38 is pulled in line with the arm 39 to be engaged by the same catch on the handle 38, is fixed to the engine framing, and is adapted to hold lever 35 in cut-out position. In this position the eccentric 29 is so turned as to lift the lever 28 clear of the cam 26 so that the valve 25 cannot be operated. At intermediate positions of the eccentric fulcrum 29 between the cut-out position just mentioned and full power position in which the lever 28 has its cam roller within operating reach of the cam, the movement of the fulcrum is normally determined by the fuel valve hand-control lever 40, the lower end of which is attached by the connecting rod 41 to the lever 42 mounted on the shaft 36 and controlling the adjustment of all the valve levers belonging to the various cylinders. Should it be desired to place any spray valve individually out of action without affecting the other spray valves the handle 38 is pulled down thus withdrawing the catch connecting the lever 37 and the handle 38. The handle 38 is then drawn forward thus actuating lever 35. When in the cut out position the handle 38 is raised thus permitting the handle catch to engage with the notch in the fixed arm 39.

The general arrangement of the spray valve gear is on the same lines as that described in the specification Serial No. 348,702.

On pulling forward the hand-control lever 40 into its lowest position all the spraying valves are cut out and in this position the lug 43 on this lever meets the push rod 44, which acts upon the locking lever 45 against the action of its spring 46. In normal position with the engine running the nose 47 of the lever 45 projects into a notch in the disc 48, which is mounted on the locking shaft 24 and corresponds to the disc 23 already described with reference to the starting air lever. Thus when the fuel valve control lever 40 is in operative position, as shown in Figure 5, the locking lever 45 prevents any movements of the locking shaft 24 and, therefore, as hereinafter described, prevents the operation of the reversing mechanism, which can consequently be actuated only when the fuel valve control lever 40 is in cut-out position.

Dealing now with the reversing apparatus, this is under control of the reversing hand lever 49, which is shown dotted in Figure 7 for the astern position, this lever actuating the small lever arm 50 on the locking shaft 24 through the link 51, the arm 50 having double faced valve-operating member 51ª, either end of which operates a pair of controlling valves, according to the position of the lever 49, for forward or astern drive. The lever 49 can be moved only when the locking shaft 24 is free.

For power reversal of the engine, which is the normal method, a servo motor is employed comprising the air cylinder 52, within which works the piston 53, and the oil cylinder 54, within which is the plunger 55 on the same rod 56 as the air piston 53.

The air cylinder 52 is connected at its two ends, respectively, through the pipes 57 and 58 to the servo motor distributor box 59, in which are air inlet and exhaust valves 60, 61 for ahead reversal of the engine and corresponding inlet and exhaust valves 62, 63 for 65 leading from the air main 4 of the starting air supply, the pipe 65 passing to a master valve 66 at the end of the distributor box 59, the inlet from the master valve 66 into the control valve system being through a pilot valve 67 under the control of the change over lever 68, which cuts off the air supply on being pulled forward, as shown in dotted lines in Figure 7, when the reversal is to be effected by hand. In the normal position of the lever 68, shown in full lines in Figure 7, the valve 67 is held open through the push rod 69 actuated by the lever 68, so that when the master valve 66 is opened pressure air is allowed to enter the box 59.

The valves 60, 61, 62 and 63 are held open through the push rods 70 and in the position shown, with the lever 49 upright, the valves 60 and 61 are held open while the valves 62 and 63 are closed under the pressure of their springs. In this position, if air pressure is admitted to the valve system, it passes through the open inlet valve 60 and a passage 71 into the pipe 58, entering the servo motor cylinder 52 at the right-hand end and moving over the piston 53 to the left, from the position shown in dotted lines into the position shown in full lines. While the piston is making its complete stroke the air to the left of the piston 53 escapes through the pipe 57 exhaust valve 61 and the passage 72 in the distributor box 59 into the exhaust pipe 64. For the reversing operation under compressed air the oil cylinder 54 serves merely as a dash-pot or buffer, the plunger 55 passing over from one end to the other and forcing the oil in front of it through the oil pipe system, which allows the oil to pass out of one end of the cylinder into the other end at the back of the piston or plunger 55.

Figure 8 shows diagrammatically the arrangement of the oil system for reversing to the ahead position under power and the detail views, Figures 9, 10 and 11, show the operations required respectively to reverse under power to the astern position and under hand-pump operation to reverse in the two directions. The oil system is under the control of the levers 49 and 68, already described, which operate, respectively, the reversing cock 73 and the change over cock 74, these two cocks being shown in the diagrammatic views, Figures 8 to 11, as side by side, but as shown in Figure 1 they may be co-axial, the cock 73 being mounted on the end of the sleeve 75 on which the lever 49 is carried, while the cock 74 is mounted on the central spindle 76, passing through plunger 55 from the right hand end of the cylinder 54 to the left hand and (this movement taking place when the engine is to be reversed from the astern to ahead position) the oil is driven out of the cylinder through the pipe 78, the passage 79, cock 73, passage 80, cock 74, back to the other side of the cock 73 through the passage 81 and thence into the pipe 77 leading to the right hand end of the cylinder 54. Owing to the comparatively lengthy passage for the oil in its movement from one end of the cylinder to the other, the oil cylinder acts as a buffer and prevents too rapid movements of the reversing apparatus.

If while the change over cock 74 remains in the same position the reversing cock 73 is turned into the position shown in Figure 9, by pulling forward the reversing lever 49, the oil travels in the opposite direction as the piston 55 moves over from left to right, but otherwise the action is similar, the reversing cock 73 playing no effective part in directing the reversing action under power, but serving for the oil control when the change over cock 74 is turned into the position shown in Figures 10 and 11.

For hand-reversing the change over lever 68 is pulled down into the dotted position shown in Figure 7, allowing the pilot valve 67 to close under spring pressure so as to prevent the admission of air to the distributor box 59. Reversing under hand power is generally employed only in the event of the air reversing gear failing, as, of course, the hand-reversal is a much lengthier operation. When the lever 68 is pulled down the change over cock 74 is moved into the position shown in Figures 10 and 11, opening the oil supply pipes 82, 83, to the reversing cock 73 and through this cock to the two ends of the oil cylinder 54.

The oil is supplied from the container or reservoir 84, to which the pipe 83 is connected, the oil container being connected through the pipe 85 to one side of the emergency hand-pump 86 to the other side of which the pipe 82 is attached. The pump 86 is of any ordinary type and, as shown, comprises the plunger 87, operated by the hand-lever 88, and the automatic inlet and outlet valves 89 and 90.

When the cocks 73 and 74 are in the position shown in Figure 10, on operating the hand-pump 86 the oil is forced through the pipe 82 and one side of the change over cock 74 and the passage 81, past the lower side of the cock 73 into the pipe 78, moving over the oil piston 55 from the left hand side of the cylinder 54 to the right. This is effected, of course, by successive strokes of the pump, the oil from the other end of the cylinder passing out through the pipe 77 and back through the two cocks, in the direction shown by the arrows in Figure 10, into the pipe 83 and thence back to the oil container.

On reversing the cock 73 into the position shown in Figure 11 the movement of the oil is in the reversed direction and the piston 55 is then moved over from the right hand end of the cylinder to the left, the arrows showing the path of the oil through the cocks.

The reversing mechanism operated by the servo motor comprises in the construction illustrated a rack and pinion motion, the piston rod 56 carrying a rack 91, which engages a pinion 92 on the cam shaft 93, carrying cams 94 which act on either one of the arms of the bell crank lever 95 so as to turn this lever, and the rock shaft 96 on which it is mounted, in either direction through an angle required to effect the reversal. On the rock shaft 96 is the reversing lever 97, which is forked and extends between collars 98 on the cam shaft 14, which carries the cams for the inlet, exhaust, fuel spray and starting valves. These cams are double, according to the well-known practice, and either one of a pair of cams is moved into operative position with relation to its valve lever, according to whether the cam shaft 14 is moved into the forward or astern driving position. The movement required is given in accordance with the direction in which the pinion 92 is turned by the rack 91, the two cams 94 coming alternatively into operative position so as to move either one of the lever arms 95, turning the shaft 96 through the required angle in either direction.

During the reversing operation it is necessary to lift the inlet and exhaust valve cam rollers off their respective cams to allow for the sliding of the cam shaft 14, and for this purpose the arrangement shown in Figure 3 is employed, comprising a bevel wheel 99 on the rocking cam shaft 93, gearing with the second wheel 100 on the crank shaft 101, the crank 102 of which is connected through the rod 103 to the lever 104 on the fulcrum shaft 30 on which are mounted the inlet, exhaust and fuel spray valve cam levers. The fulcrum shaft 30 carries the eccentric fulcrum 29 for the spray valve lever, as already described, and has keyed to it the eccentric fulcrums 105 and 106 for the inlet and exhaust valve cam levers 107 and 108, the cam rollers 109 and 110 of which are operated, respectively, by either one of two pairs of cams 111 and 112 on the cam shaft 14, the cams in operation at any time depending upon the direction into which the shaft 14 has been displaced by the reversing mechanism. The levers 107, 108 which are of bell crank form are connected through the rods 113, 114 to their respective inlet and exhaust valves, the inlet valve 115 being shown in Figure 3. To prevent the fulcrum shaft 30 from rotating until deliberate force is applied at the servo motor to actuate the reversing gear, a bell crank locking lever 116 is provided under the control of the spring 117, which lever carries the roller 118 adapted to engage in a small notch in the locking disc 119 on the fulcrum shaft 30. The spring controlled lever holds the rocking shaft 30 in running position and prevents any accidental displacement, thus enabling air to be shut off from the system without liability to creeping of the gear.

To prevent operation of the starting air and spray valve control levers 15 and 40, except when the reversing mechanism is in one or other of its extreme positions, a pair of locking discs 120 and 121 are provided for these levers, under the control of the locking levers 122 mounted one on each side of the discs, as shown in Figure 6, and connected together by the spring 122ª. The two levers 122 are alternately displaced into inoperative position by the double armed lever 123 on the fulcrum pin 124, the said lever being connected by the rod 125 to the lever 126, the other end of which is connected by the rod 127 to the crank 128 on the crank shaft 128ª. The crank 128 is rotated through not more than a half revolution by the spur reducing gear 129 on the end of the cam shaft 93, as shown in the plan view, Figure 2. The locking levers 122 are also under the control of the lever 130 on the locking shaft 24, as shown in Figure 6, the end of this lever 130 moving back one or other of the locking levers 122 out of locking position, that is, clear of the locking disc, according to the position of the lever 130. If at the same time the opposite lever 122 has been moved out of locking position by the lever 123 and the connections from the reversing mechanism, the discs 120 and 121 are both free and the levers 15 and 40 can be operated. The gear is not freed till both the reversing lever and the reversing gear are fully over in the same direction, that is, till the servo motor has obeyed the lever.

The general operation of the engine, controlled in accordance with this invention is as follows:—

When the engine is running the cam shaft 14 is driven at the required speed from the crank shaft through the bevel wheels 131, 132 and the vertical shaft 133 in the usual manner. To stop the engine the hand lever 40 (see especially Figure 5) is pulled forward into the off position, moving all the fuel valve levers 28, through the intervening lever and link arrangements and the common control shaft 36, away from their respective cams 26 so that all the spray valves 25 of the engine are thrown out of operation and the engine thereupon stops.

As long as the control lever 40 is in the on position, as shown in Figure 5, the interlocking gear, above described, prevents the movement of the reversing lever 49, but when the lever 40 is pulled down the locking lever 45 is moved out of engagement with the locking disc 48 on the shaft 24 and the reversing lever 49 is free to act.

If now the engine, which it is assumed has been stopped when in the astern position, is to be restarted ahead from rest, the air supply master valves 5 and 66, admitting air respectively to the rapid action valve 8 and the servo motor air distributor box, are opened, and the reversing lever 49 is moved over from the astern to the ahead position, that is, from the pulled forward position, shown in Figure 3, to the upright position, shown in Figures 7 and 8. The pressure air, acting through the valve arrangements and the servo motor in the manner already described, operates the reversing gear and moves the cam shaft 14 from its astern to its ahead position. As soon as this is effected the starting control lever 15 is released by the interlocking mechanism, so that this lever, which may already be under pressure by the operator, can be pulled over from the off position, shown in Figure 4, to the on position, opening the rapid action valve 8 and allowing the starting air to pass through the distributing pipe 10 to the air timing valves 12 of the various cylinders. The air passes through any of these valves which are open at the moment, owing to the position of their cams, into the corresponding cylinders, entering through the non-return valves 12ª, and the engine starts under air. The movement of the lever 15 releases the locking lever 20, which thereupon engages the locking shaft 24 through the disc 23, preventing any movement of the reversing lever 49 as long as the starting air lever is in on position.

The fuel control lever 40 is free for operation and the operator, as soon as the engine has started under air, moves this lever back to the power position, bringing the spray valve levers 28 again into contact with their cams 26, which cams are now those for the ahead drive of the engine. Owing to the non-return valves 12ª back pressure, due to the cylinders which are firing, does not affect the starting air supply, but as soon as the engines are all firing the lever 15 is moved back to the off position and the starting air supply is cut off through the rapid action valve 8. If the engine is not being manœuvred, for example, in bringing a ship into or out of port or guiding it through narrow channels, the starting air can be definitely cut off by the master valves 5 and 66, but if the engine is to be rapidly stopped, started and reversed, the master valves are left open and the air control is effected through the rapid action valve 8 being turned on and cut off instantly whenever required. When the lever 40 has been moved back to power position the interlocking gear, shown in Figure 5, again comes into action and the reversing lever 49 cannot be operated as long as the fuel supply is on.

To stop and reverse the engine when running ahead the stopping operation is effected as already described, and immediately the engine stops firing the hand lever 49 is pulled over into the astern position. As soon as the gear is reversed the air control lever 15 will be unlocked and is then moved to the on position and the fuel control lever 40 is again moved to the on position when the engine has started. As before, when the engine begins to run on fuel the air starting lever 15 is returned to the off position.

For hand reversing the operations are as above described, with the exception that the air supply to the servo motor is cut off by the change over lever 68 and the slow reversing operation has to be carried out by the pump 86.

It will be seen that the control of the engine can be effected in a very rapid manner by the simple operation of the control levers, and the interlocking arrangement is such that the control levers cannot be operated when their operation would interfere with the working of the engine. If the fuel control lever is in the normal running position the reversing lever cannot be operated, no matter what is the position of the starting air lever, while if the fuel control lever is in the off position and starting air is on, the reversing lever is again held and reversal cannot take place until the starting air is cut off, so that both fuel and starting air have to be cut off if the reversing lever is to be operated. Moreover, the fuel valve and the air control levers are themselves locked in inoperative position during reversal and they are not released until the reversing movement is completed.

The control gear presents advantages not only in rapidity of action, but in economy of construction and in the space occupied. The operating gear can be placed on top of the engine and only the light hand control mechanism placed at the power part of the engine in a convenient position for operation. This improves the accessibility of the engine itself, as the main body of the control gear is clear of the front of the engine.

What I claim and desire to secure by Letters Patent of the United States is:—

1. In control and reversing gear for internal combustion engines, air starting mechanism, a lever controlling the air starting operation, reversing mechanism, a servo motor actuating the said reversing mechanism, a lever controlling the said reversing servo motor, interlocking mechanism between the said servo motor lever and the air starting lever and further interlocking mechanism between the servo motor and the air starting lever adapted to prevent the use of the said air starting lever until the reversing movement has been completed by the servo motor in accordance with the direction given by the reversing lever.

2. In control and reversing gear for internal combustion engines, starting air and fuel supply mechanism, a reversing lever, interlocking gear associated with both the starting air and fuel supply mechanism and adapted to hold the reversing lever in either one of its two normal positions except when both starting air and fuel supply are cut off, an air distributor box, a pressure air supply connected to the said distributor box, controlling valves in the said box operated by the reversing lever in either one of its two normal positions, and a servo motor effecting the reversing operation and supplied with pressure air to either end according to the position of the reversing lever and the corresponding operation of the distributor valves.

3. In control and reversing gear as claimed in claim 2, a liquid supplied cylinder provided with a plunger connected to the air operated servo motor, means for controlling the flow of liquid between the two ends of the said cylinder, a hand operated pump, a change over lever operating the liquid flow controlling means, the said change over lever being adapted, according to its position, either to provide direct communication between the two ends of the said liquid cylinder, or to interpose between the two ends the said hand operated pump, and means whereby the pressure air supply to the servo motor is cut off by the change over lever when the hand operated pump is brought into the cylinder circuit.

4. In control and reversing gear as claimed in claim 2, a liquid supplied cylinder provided with a plunger connected to the air operated servo motor, a communicating channel between the ends of the said cylinder, a pair of liquid control cocks interposed in the said channel one of which cocks is operated by the reversing lever, a hand operated pump, a change over lever adapted to operate the second cock and, according to its position, either to provide through the said cock direct communication between the two ends of the said cylinder or to interpose between the two ends the said hand operated pump, and means whereby the pressure air supply to the servo motor is cut off by the change over lever when the hand operated pump is brought into the cylinder circuit.

5. In control and reversing gear for internal combustion engines, a lever controlling the supply of starting air for starting the engine, a lever controlling the fuel supply to the engine, engine reversing mechanism and an interlocking device between the reversing mechanism and both of the aforesaid levers adapted to lock the levers in inoperative position during the reversing movement and to release the levers for operation only after the reversing movement has been completed in accordance with the direction indicated by the reversing control device.

6. In control and reversing gear for internal combustion engines, reversing mechanism, a servo motor operating the said mechanism, a reversing lever controlling the servo motor, starting air mechanism, a lever controlling the starting air, fuel supply mechanism, a lever controlling the said fuel supply, interlocking mechanism interposed between the reversing mechanism and both the starting air and fuel control levers, the said interlocking mechanism being under the control both of the reversing lever and of the servo motor and adapted on moving over the reversing lever to secure the starting air and fuel control levers in inoperative position until the servo motor has effected the reversing operation.

7. In control and reversing gear for internal combustion engines, reversing mechanism, a servo motor operating the said mechanism, a reversing lever controlling the servo motor, starting air mechanism, a lever controlling the starting air fuel supply mechanism, a lever controlling the said fuel supply, interlocking mechanism interposed between the reversing mechanism and both the starting air and fuel control levers, the said interlocking mechanism comprising a pair of locking members one fitted to each of the said levers, a pair of spring controlled catches adapted to engage both of the said locking members, an arm operated by the reversing lever and adapted to release either catch alternatively according to the position of the lever and a connection from the servo motor adapted to release the second catch.

8. In control and reversing gear for internal combustion engines, reversing mechanism, a servo motor operating the said mechanism, a reversing lever controlling the said servo motor, a starting air control lever, a fuel control lever and interlocking gear between the said reversing lever and the starting air and fuel control levers, said gear comprising a locking shaft and independent catch devices belonging respectively to the starting air control lever and the fuel control lever and adapted to release the said locking shaft only when both the air and fuel control levers are moved into cut off positions.

9. In reversing mechanism for internal combustion engines, a reversible air driven servo motor, a cam shaft adapted to be moved longitudinally from one position to another for reversing purposes, rack and pinion mechanism operated by the servo motor, a shaft operated by the said rack and pinion mechanism, a pair of cams on the said shaft, a bell crank lever the arms of which are operated alternatively in opposite directions by the said cams and a connection from the said bell crank lever to the cam shaft of the engine, adapted to displace the said cam shaft longitudinally into either of its reversing positions.

10. In reversing mechanism as claimed in claim 9, inlet and exhaust cam levers, a fulcrum shaft carrying eccentric fulcrums for the said levers, and a connection from the servo motor driven mechanism to the said fulcrum shaft whereby the eccentric fulcrums are turned so as to move the said inlet and exhaust cam levers into inoperative position during the reversing movement of the servo motor.

JAMES McKECHNIE.